United States Patent
Mercante

(10) Patent No.: US 6,761,254 B2
(45) Date of Patent: Jul. 13, 2004

(54) BRAKE ASSEMBLY, IN PARTICULAR FOR CYCLISTS' TRAINING DEVICE

(75) Inventor: Gaetano Mercante, Cittadella (IT)

(73) Assignee: Elite Srl, Fontaniva (IT)

( * ) Notice: Subject to any disclaimer, the term of this patent is extended or adjusted under 35 U.S.C. 154(b) by 0 days.

(21) Appl. No.: 10/243,769

(22) Filed: Sep. 16, 2002

(65) Prior Publication Data

US 2003/0051952 A1 Mar. 20, 2003

(30) Foreign Application Priority Data

Sep. 19, 2001 (IT) .................................... VI2001A0198

(51) Int. Cl.[7] .............................................. F16F 15/03
(52) U.S. Cl. ...................... 188/267; 188/164; 188/158; 482/63; 310/93
(58) Field of Search ................................ 188/267, 164, 188/161, 163, 158, 159, 160, 162; 482/63, 65, 61; 310/93, 103, 104, 105

(56) References Cited

U.S. PATENT DOCUMENTS

| | | | | |
|---|---|---|---|---|
| 3,579,003 A | * | 5/1971 | Gray ............................ | 310/93 |
| 5,460,585 A | * | 10/1995 | Gentry et al. .................. | 482/1 |
| 5,468,201 A | * | 11/1995 | Minoura ....................... | 482/61 |
| 5,472,392 A | * | 12/1995 | Haan et al. .................... | 482/61 |
| 5,711,404 A | * | 1/1998 | Lee .............................. | 188/164 |
| 5,792,030 A | * | 8/1998 | Sartore ......................... | 482/61 |
| 5,916,068 A | * | 6/1999 | Chisholm et al. .............. | 482/61 |
| 6,084,325 A | * | 7/2000 | Hsu .............................. | 310/74 |
| 6,459,184 B1 | * | 10/2002 | Ozeki ........................... | 310/93 |
| 6,551,220 B1 | * | 4/2003 | Schroeder ...................... | 482/57 |

FOREIGN PATENT DOCUMENTS

JP   59-56840 A   *   4/1984   ................... 310/93

* cited by examiner

*Primary Examiner*—Jack W Lavinder
*Assistant Examiner*—Mariano Sy
(74) *Attorney, Agent, or Firm*—Daniel O'Byrne

(57) ABSTRACT

Brake assembly for cyclists' training device, provided with a support structure (7) on which there is rotatably mounted a shaft (10) having, keyed thereto, a roller (6) rotating in contact with the rear wheel of a bicycle. An end portion (12) of the shaft (10) is provided for this purpose with magnetic elements (13) able to exert a resistive torque and provided with a rotor (17) keyed onto the shaft (10) and carrying, fixed thereon, one or more permanent magnets (18) and a stator (19) mounted on the support structure (7) in the vicinity of the rotor (17). The stator (19) is composed of a disk of ferromagnetic material (20) and a shaped plate (21) of substantially conductive and non-magnetic material fixed to the ferromagnetic disk (20) on the side where the rotor (17) is located.

18 Claims, 4 Drawing Sheets

BRAKE ASSEMBLY, IN PARTICULAR FOR CYCLISTS' TRAINING DEVICE

BACKGROUND OF THE INVENTION

The present invention concerns a brake assembly for a cyclists' training device, which has an application in the sports equipment and leisure sector.

More particularly, the brake assembly in question is intended to be advantageously mounted on training devices, for example of the type used by cyclists, which can be used both in the open, for example in order to warm up muscles before a cycling race, and in homes or gyms for example when the atmospheric conditions are such that normal cycling activity is impossible.

At present, various training devices for cyclists provided with a brake assembly of the type in question are available on the market, all of said devices essentially comprising a support frame provided with a clamp for fixing the hub of the rear wheel of a bicycle so that the wheel rotates in contact with a horizontal roller of the brake assembly.

Generally, the brake assembly also has suitable resistance means acting on the roller in order to simulate a resistance to forward movement and adjusting means associated with the resistance means, for varying the intensity of the above-mentioned resistance.

As is known, the resistance means may be of the mechanical, electrical, hydraulic or magnetic type depending on the physical principle which is adopted in order to oppose rotation of the roller by means of a resistive torque acting against rotation thereof.

Mechanical resistance means are generally excessively noisy and do not operate in an entirely satisfactory manner since they do not allow application of a resistive torque proportional to the speed of rotation, as instead would be desirable.

Resistance means of the hydraulic type are able to simulate more effectively the resistive torque applied to the roller upon variation in the pedaling speed and, in accordance with the embodiment illustrated in international patent application No. PCT/EP96/04861 in the name of the same applicant, are generally provided with a chamber containing a viscous fluid in which a rotor mechanically connected to the roller is immersed.

This constructional solution has proved in practice to be excessively complex, costly to produce and difficult to assemble.

As is known, with resistance means of the electrical type it is possible to vary in a more suitable manner the resistive torque applied. Said means generally envisage the use of an excitation coil which is mounted fixed on the training device and supplied with direct current in a controlled manner so as to generate a magnetic field, the flux lines of which extend radially outwards preferably conveyed by electromagnetic disks with radial teeth.

A disk mechanically connected to the transmission of the device, so as to be made to rotate by the action of the cyclist on the pedals, is rotatably mounted on the outside of the coil. The disk, when rotating about its axis, passes through the magnetic field lines produced by the coil and consequently causes the generation of parasitic currents able to oppose rotation of the disk, exerting a braking torque having an intensity dependent upon the current applied to the coil.

These known braking devices of the electromagnetic type are described and claimed for example in the U.S. Pat. No. 5,042,794 and U.S. Pat. No. 5,072,930 and have the drawback that they require a power supply drawn from a power socket with mains voltage and therefore are not very suitable for use in external environments.

Such type of use is, however, desirable and useful for athletes who need to perform a warm-up in the open, for example before a race, or for ordinary users who wish to train in a garden, at a campsite or at the seaside, where power sockets are not available.

Moreover, from a constructional point of view they are excessively complex and disadvantageous from a cost point of view.

In accordance with the embodiment described in the patent EP-A-603,454, the magnetic resistance means envisage the generation of a resistive torque by causing the rotation of a disk of paramagnetic material which is rigidly connected to the roller rotation shaft inside a magnetic field produced by two opposite series of permanent magnets mounted on two support disks facing each other and fixed with respect to the rotating disk.

Adjustment of the intensity of the field between the disks and therefore of the resistive torque produced by the field as a result of the parasitic currents induced in the rotating disk is performed by varying the relative position of the two series of magnets, achieved by varying the relative angular position of the two disks supporting the said permanent magnets.

In practice, this embodiment has been unable to ensure an adequate resistive torque. Moreover, it necessarily envisages the use of a second rotating disk of heavy material having the function of a flywheel in order to increase the moment of inertia of the device. In addition to this, this known solution is excessively complex from a constructional point of view and difficult to assemble.

In the U.S. Pat. No. 5,051,638 the magnetic field is created between two cylindrical plates of ferromagnetic material, one of which is fixed and has mounted thereon a plurality of permanent magnets and the other of which is rotating and has fixed thereon a disk of conductive paramagnetic material, such as, for example, aluminum or copper.

In this case also, it is necessary to envisage the use of a second rotating disk as a flywheel in order to increase the moment of inertia of the brake assembly.

Entirely similar embodiments are also contained in the patents NL 1008474 and U.S. Pat. No. 5,586,624. In particular, this latter patent describes and illustrates a solution in which advantageously the same rotating plate of ferromagnetic material, which in this case supports aluminum sheets, also acts as a flywheel for the assembly and for this purpose has a suitable weight and dimensions.

In both the embodiments contained in the two patents NL 1008474 and U.S. Pat. No. 5,586,624, adjustment of the magnetic field and therefore the resistive torque is obtained by varying the distance of the disks between which the magnetic field is produced.

OBJECTS OF THE INVENTION

In this situation, the main object of the present invention is therefore that of providing a brake assembly for a cyclists' training device, which is constructionally simple, low-cost and easy to assemble and is able to achieve an effective resistive torque with an optimum action upon variation in the force exerted by the user.

Another object of the present invention is that of providing a brake assembly for a cyclists' training device which is completely silent.

A further object of the present invention is that of providing a brake assembly for a cyclists' training device which allows easy and selective adjustment of the force required of the user.

These objects, together with others which will be clarified more fully below, are achieved by a brake assembly, in particular for a cyclists' training device, comprising: a support structure, a shaft rotatably mounted on the support structure and provided with a first portion capable of being rotationally driven by the action of a user and a second portion provided with magnetic means able to exert a resistive torque on the shaft.

SUMMARY OF THE INVENTION

According to the invention the assembly is characterized in that the magnetic means comprise in turn: at least one rotor keyed onto the shaft and having, fixed thereon, one or more permanent magnets; and at least one stator mounted on the support structure in the vicinity of the rotor and comprising a disk of ferromagnetic material and a shaped plate of substantially conductive and non-magnetic material which is fixed to the ferromagnetic disk and physically located between the rotor and the ferromagnetic disk; the rotation of the shaft and consequently the rotor being able to produce, as a result of the action of parasitic currents generated on the stator, a resistive torque able to oppose rotation of the shaft itself.

Owing to this invention, the brake assembly may be produced at very low costs and may be easily mounted on training devices, in particular for cyclists, intended to be used both in closed environments and in open environments.

BRIEF DESCRIPTION OF THE DRAWINGS

The technical features and advantages of the invention will be more clearly understood from the contents of the detailed description of some preferred, but not exclusively, embodiments of a brake assembly according to the invention, illustrated by way of a non-limiting example with the aid of the accompanying drawings in which.

DETAILED DESCRIPTION OF THE INVENTION

With reference to the attached drawings, a cyclists' training device and the brake assembly forming the subject of the present invention have been indicated in their entirety by 1 and 2, respectively.

The brake assembly is particularly suitable for use, as will be described below, as a device with a variable resistance to rotation which can be applied in the sports sector to any training apparatus which requires a resistive torque opposing the force applied by a user.

Figure 1:
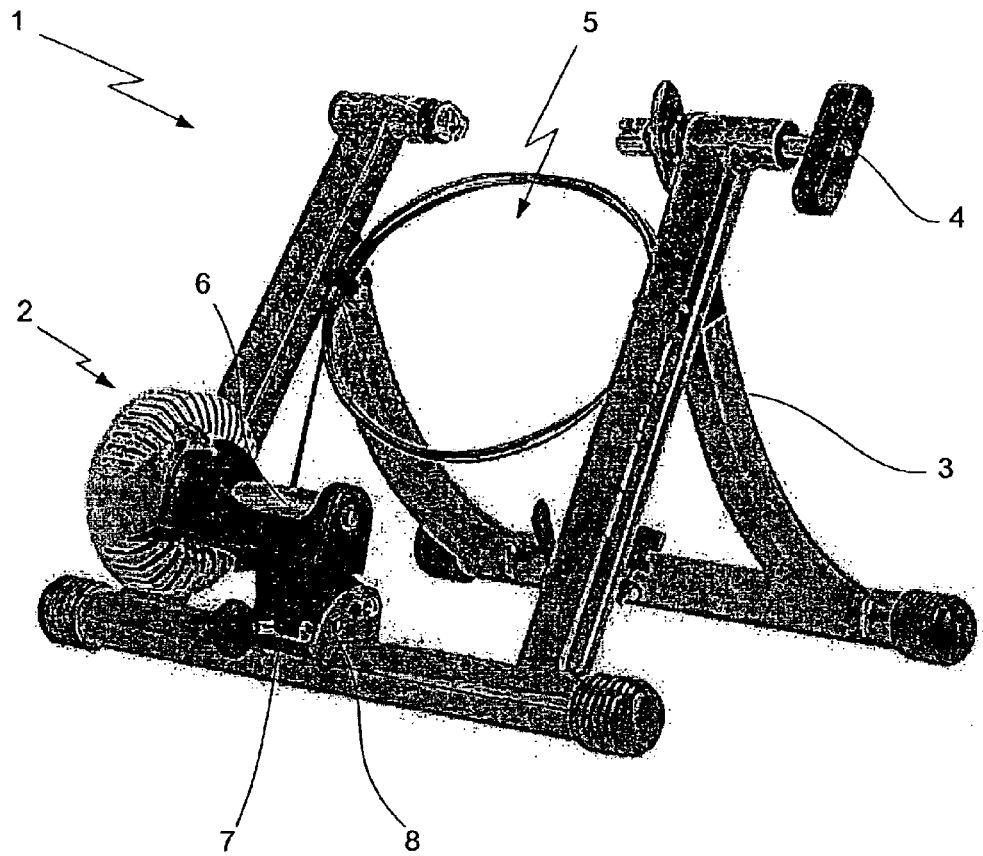
FIG. 1 shows an overall perspective view of a cyclists' training device with, mounted, a brake assembly according to the invention.

Below reference will be made for the sake of simplicity of description to a brake assembly applied to a cyclists' training device of the type illustrated in FIG. 1, it being understood, however, that it may also be applied to other apparatus in order perform exercise without thereby departing from the protective scope of the present patent.

In greater detail, the cyclists' training device essentially comprises a support trestle or frame 3 which consists of metal or plastic sections and on which the brake assembly 2 according to the present invention is mounted.

The top of frame 3 has fixed thereto a clamp 4 intended to clamp the hub of the rear wheel of a bicycle, not shown in the drawings, so that the latter is housed in the central compartment 5 of the frame 3 and remains in contact with a roller 6 of the brake assembly 2, as will be described in detail below.

Therefore, after mounting a bicycle on the frame 3 so that its rear wheel is in contact with the roller 6, a user is able to cause rotation of the roller 6 which will be braked by the brake assembly 2 so as to simulate the resistance to forward movement experienced by an ordinary cyclist (due to friction produced by the air, the road and, where applicable, the effect of an uphill section).

In greater detail, the brake assembly 2 comprises a support structure 7 preferably made of plastic and fixed to the frame 3 by suitable fastening means 8.

The structure 7 supports, by means of two bearings 9, a shaft 10 rotating along an axis X parallel to the axis of rotation of the rear wheel of the bicycle mounted on the device 1.

The same shaft 10 is provided with a first portion 11 having, keyed thereon, the abovementioned roller 6 capable therefore, as mentioned, of being rotationally driven by the action of a user and a second portion 12 on which suitable magnetic means 13 are provided, said means being able to exert a resistive torque on the shaft 10 and therefore brake rotation of the roller 6, obliging the user to exert a greater force.

Figure 3:
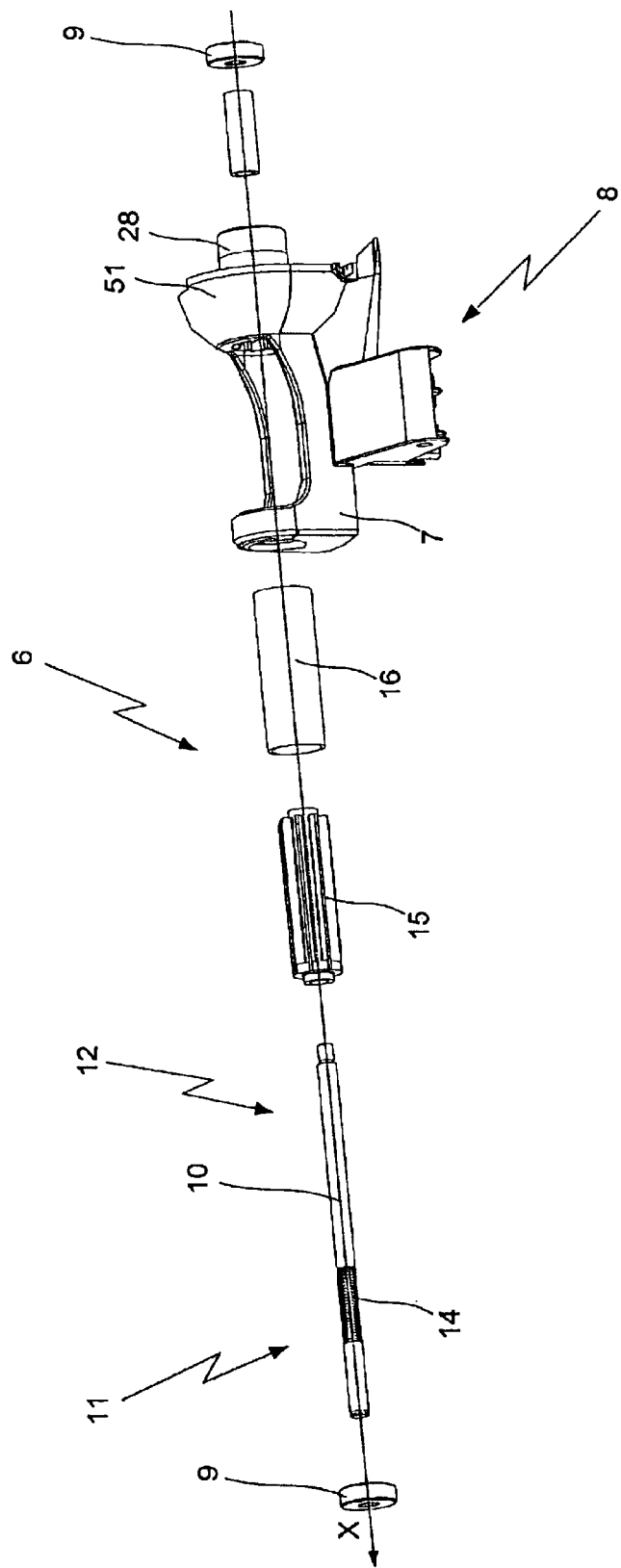
FIG. 3 shows an exploded perspective view of a first group of components which form the brake assembly in question.
Figure 4:
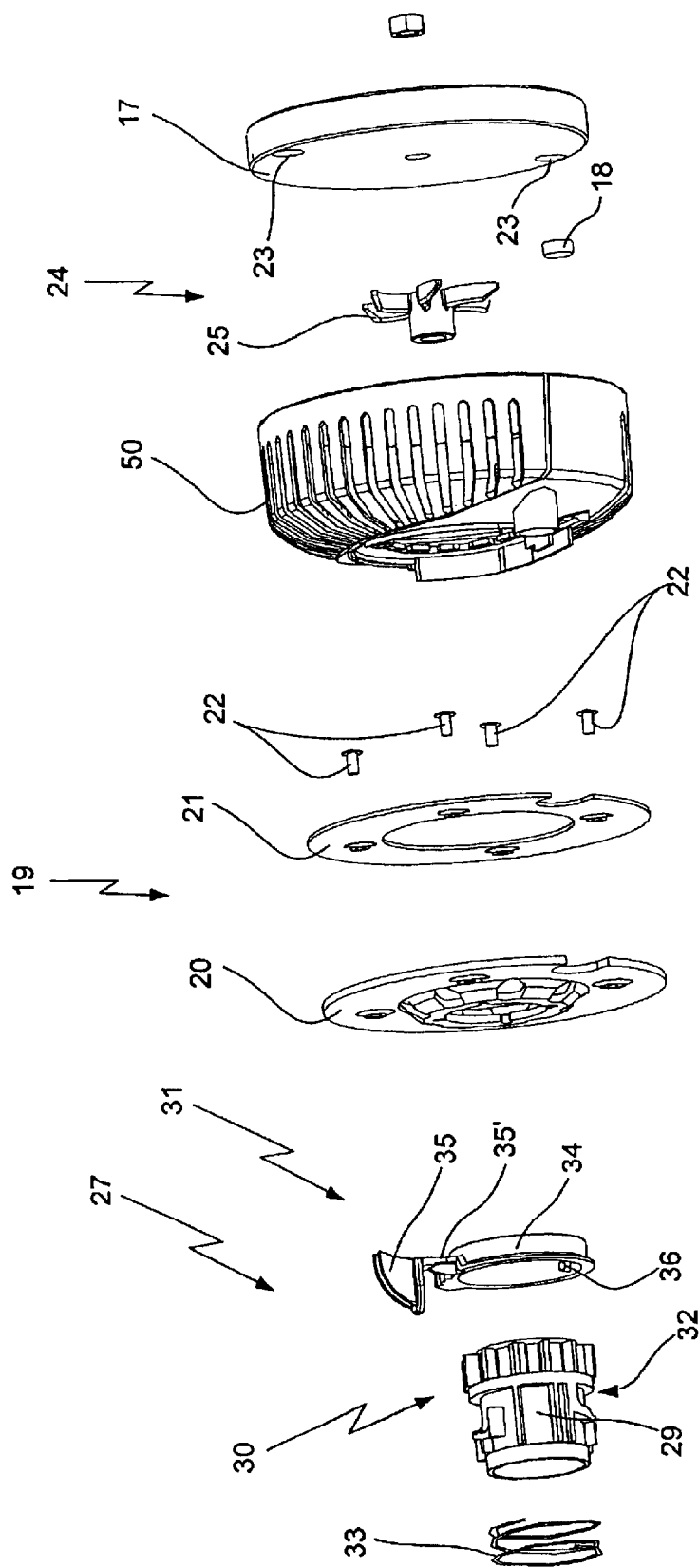
FIG. 4 shows an exploded perspective view of a second group of components which form the brake assembly in question.

In accordance with the exploded view shown in FIG. 3, the shaft 10 is provided with a knurled surface 14 gripping against a cylindrical plastic body 15 of the roller 6 which supports, fixed on the outside, a metal cover 16 intended to come into contact with the rear wheel of a bicycle.

According to the invention, the brake assembly 2 comprises a rotor 17, which is keyed onto the shaft 10 and having fixed thereon one of more permanent magnets 18, and a stator 19 mounted on the support structure 7 in the vicinity of the rotor 17 and substantially immobile with respect to the latter. The stator 19 is composed of a disk 20 of ferromagnetic material and a shaped plate 21 of substantially conductive and non-magnetic material which is fixed to the ferromagnetic disk 20, for example by means of rivets 22 or by means of screws or other fixing means, and is physically located between the rotor 17 and the ferromagnetic disk 20.

In accordance with this configuration, following rotation of the shaft 10, parasitic currents are produced in the stator 19, and in particular in the shaped plate 21, and generate a resistive torque able to oppose rotation of the shaft 10.

Advantageously, the shaped plate 21 is made of conductive paramagnetic material, such as aluminum or copper, in order to facilitate circulation thereon of the parasitic currents.

Operationally speaking, the flux lines of the magnetic field which is created between the rotating permanent magnets 18 partially inset inside recesses 23 formed in the rotor 17 and the ferromagnetic disk 20 are passed through by the shaped plate 21, thus causing as a result of the known effect of electromagnetic induction the formation of the abovementioned parasitic currents having a direction such as to create in turn a field able to oppose the main field which produced them.

The rotor 17 will preferably consist of a disk made of iron, steel or other ferromagnetic material with a mass designed mainly to impart to the rotating parts of the assembly 1 a moment of inertia capable of ensuring a uniform pedaling action of the cyclist. The flywheel also allows simulation, to a certain degree, of the actual behavior of a bicycle. In fact, as is known, normally when a cyclist stops pedaling, the inertia accumulated by his/her moving mass and the mass of the bicycle cause the cyclist to continue moving forwards over a certain distance until the frictional force, and in particular the wind, causes the cyclist to come to a halt.

The mass of the rotor 17 may be of a quantity designed to simulate this inertial effect. When determining the mass, reference was obviously made to hypothetical mean values of cyclists' weights and frictional forces.

Advantageously, it should be noted that, in accordance with the proposed configuration, fixing of the permanent magnets 18 to the rotor 17 is particularly simplified by the considerable thickness of the latter, which, while being designed to allow the rotor 17 to perform also the function of a flywheel, at the same time allows the formation of particularly deep recesses 23 in which the magnets 18 can be easily inserted and fixed. Obviously, the same practical and effective fixing ensured by the recesses 23 would be more complex to achieve on the stator with a smaller thickness. Moreover, in view of the considerable forces at play, fixing of the magnets 18 to the rotor 17 must be particularly stable. This is made possible by fixing (for example by means of gluing or welding) the magnets 18 inside the recesses 23 easily formed on the rotor 17 (for example by means of a milling cutter).

Figure 2:
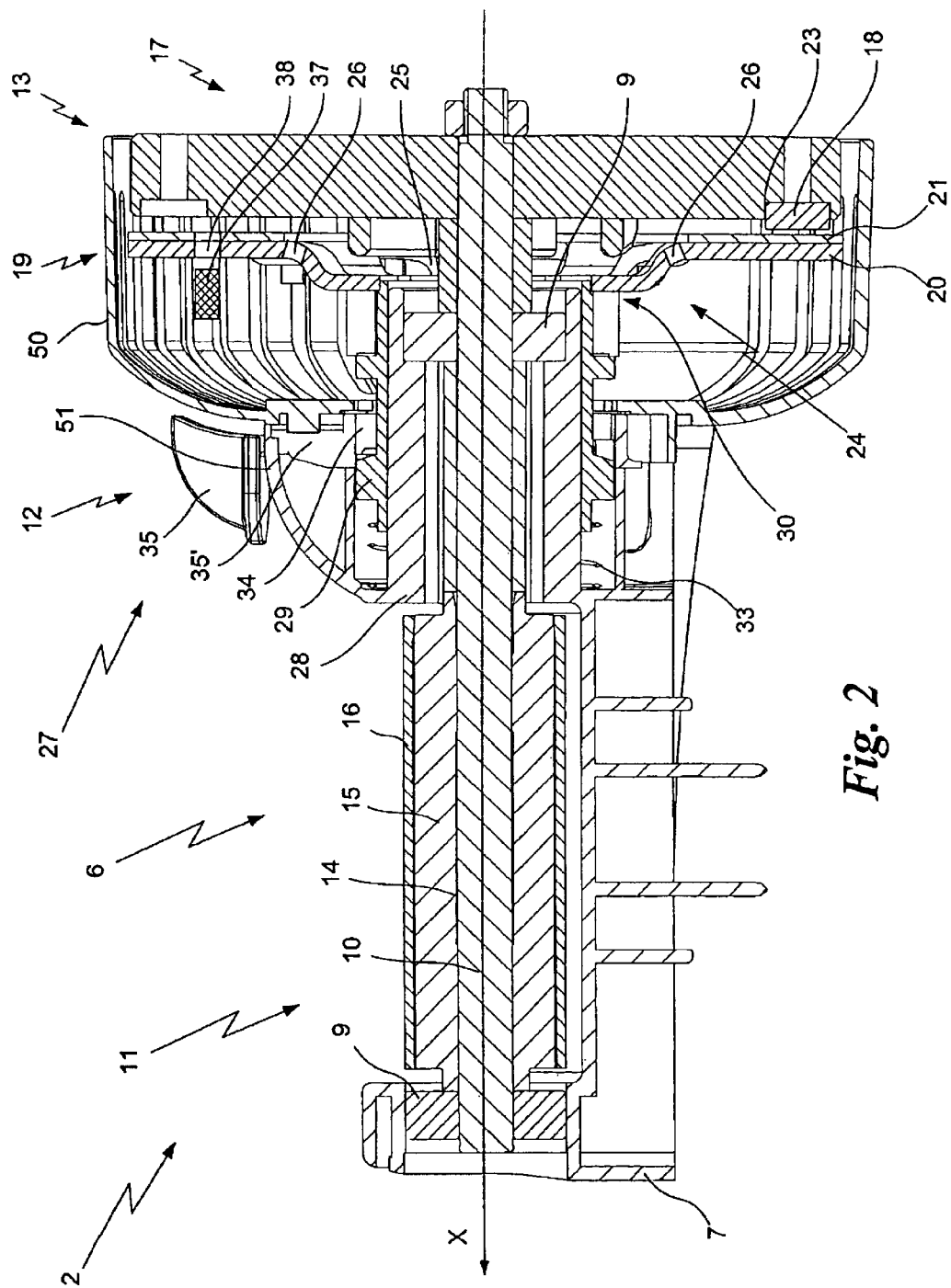
FIG. 2 shows a longitudinally sectioned view of the brake assembly according to FIG. 1.

In accordance with a further characteristic feature of the present invention, the assembly 2 is also provided with ventilation means 24 arranged between the rotor 17 and the stator 19. Preferably, these means are formed by a fan 25 which is keyed onto the shaft 10, as illustrated in FIG. 2, or otherwise fixed directly onto the side of the rotor 17 directed towards the stator 19.

The ventilation means 24 allow disposal of the heat accumulated as a result of the Joule effect of the parasitic currents on the stator 19 and as a result of irradiation and convection phenomena also on the rotor 17.

A further partial dissipation of the quantity of heat accumulated in the magnetic means 13 may be obtained by providing through-holes 26 on the ferromagnetic disk 20 which favor circulation of cooling air.

In accordance with a further important feature of the present invention, the brake assembly 1 comprises adjustment means 27 associated with the magnetic means 13 for varying the intensity of the resistive torque, responsible for increasing or diminishing the force exerted by the user of the training device 1.

In greater detail, said means advantageously comprise a guide 28 formed as a cylindrical sleeve, integral with the support structure 7, and a slider 29 in the form of a hollow cylindrical bush mounted coaxially and slidably over the guide 28 and carrying the stator 19 fixed on the end 30.

Suitable actuator means 31, which can be operated manually, acts so as to displace the slider 29 along the guide 28, moving the stator 19 selectively into different operating positions, towards or away from the rotor 17.

An opposition spring 33 is provided, being compressed between the support structure 7 and the slider 29 as to push the latter towards the rotor 17.

In accordance with the example of embodiment illustrated in the accompanying drawings, the actuator means 31 consist of an annular element 34 from which a lever 35 with shank 35' extends in a projecting manner. One or more engaging elements 36 are fixed inside the annular element 34, said elements being able to engage in shaped seats 32 (also as a result of the action of the spring 33) formed in the external surface of the slider 29 and corresponding to different possible operating positions, i.e. different relative positions of the stator 19 with respect to the rotor 17.

Functionally speaking, the different operating positions also correspond to different settings, during operation, of the brake assembly 2. In fact, the operating positions where there are greater distances between rotor 17 and stator 19 allow an action which is easier and therefore distinguished by lower resistive torques, while the operating positions where there are smaller distances between rotor 17 and stator result in an action which is harder and therefore distinguished by higher resistive torques.

Figure 5:
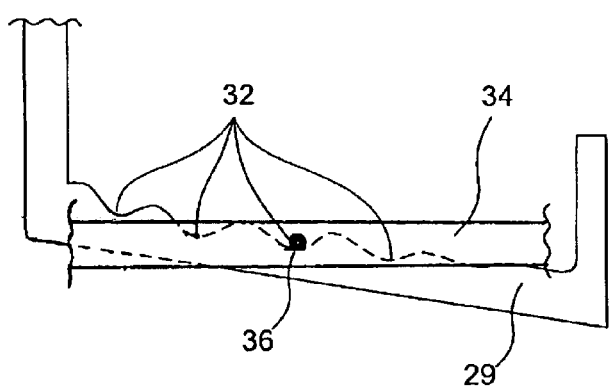
FIG. 5 shows a schematic view of a detail of the assembly relating to the adjustment means.

For easier understanding, in FIG. 5 the facing cylindrical surfaces of the slider 29 and the annular element 34 of the actuator means 31 have been shown schematically on one plane.

Advantageously the positions of the seats 32 are provided in a spatial succession able to determine a gradual and linear variation in the resistive torque. In other words, the gradual engagement of the engaging element 36 in succession in the various seats produces a linear increase (or reduction) of the resistive torque.

In order to obtain this result it must obviously be taken into account in the arrangement of the seats 32 that the progression of the resistive torque upon variation in the distance between the rotor 17 and the stator 19 is not linear. Therefore, in order to obtain variations of an equal nature in the resistive torque, moving in succession the actuator means 31, it is required to arrange the seats 32 at relative axial distances gradually increasing as the rotor 17 moves linearly away from the stator 19.

The abovementioned lever 35 may also obviously be connected to one end of a flexible cable guided inside a semi-rigid sheath, with the opposite end fixed to a lever-type switching device which can be secured for example on the handlebars of the training device 1.

Functionally speaking, manually rotating the lever 35 or exerting a pulling force on the cable in order to obtain a similar rotation of the lever 35 on the external surface of the slider 29 causes axial displacement of the entire slider 29 so as to vary the operating position of the brake assembly 1 and therefore increase or decrease the braking torque which is applied to the roller 6.

The lever 35 may only rotate about the slider 29, but cannot be displaced axially since it is arranged between two fixed parts of the support structure 7 (between the cowl 50 and the cap 51). Consequently, in order to rotate the lever 35, it is necessary to overcome the resilient force of the spring 33 which exerts a thrusting action on the slider 29 which is in turn arranged resiliently in bearing contact against the annular element 34 fixed to the same lever 35.

Sensor means 37 able to detect the speed of rotation of the rotor 17 and generate a corresponding electric signal may also be advantageously provided. These sensor means 37 may comprise an inductive rev counter formed for example by a Hall sensor able to detect the passing movement of the magnet 18.

Advantageously, the distance of the sensor 37 with respect to the rotor 17 will be kept constant and for this purpose an opening 38 will be provided on the stator 19, movable axially, in order to allow the sensor 37 fixed to the support structure 7 to pass inside it.

Alternatively, the sensor 37 may be able to detect the presence of the magnet 18 also in the absence of an opening 38, namely with an opening formed only on the shaped plate 21.

The invention thus conceived therefore achieves the predefined objects.

Obviously, during its practical realization, it may also assume forms and configurations which are different from that illustrated above without thereby departing from the present scope of protection.

Moreover, all the details may be replaced by technically equivalent elements and the dimensions, the forms and the materials used may be of any nature according to requirements The instant application is base upon and claims priority of patent application no. VI2001A000198 file on Sep. 19, 2001 in Italy, the disclosure of which is hereby expressly incorporated here in reference thereto.

What is claimed is:

1. Brake assembly, in particular for a cyclists' training device, comprising:
   a support structure (7);
   a shaft (10) rotatably mounted on said support structure (7) and a provided with a first portion (11) capable of being rotationally driven by the action of an user and a second portion (12) fixed to the first portion and provided with magnetic means (13) able to exert a resistive torque on said shaft (10);
   wherein said magnetic means (13) comprise:
      at least one rotor (17) keyed onto said shaft (10) and having, fixed thereon, one or more permanent magnets (18);
      at least one stator (19) mounted on said support structure in the vicinity of the rotor (17) and comprising a disk of ferromagnetic material (20) and a shaped plate (21) of substantially conductive and non-magnetic material which is fixed to said ferromagnetic disk (20) and located between said rotor (17) and said ferromagnetic disk (20); the rotation of said shaft (10) and of said rotor (17) inducing in said stator (19) parasite currents capable of generating a resistive torque opposing the rotation of said shaft (10).

2. Brake assembly as claimed in claim 1, wherein said rotor (17) operates as a flywheel associated with the rotating shaft (10) of said assembly (2).

3. Brake assembly as claimed in claim 2, wherein said rotor (17) has a mass capable to impart to said shaft (10) a moment of inertia suitable to ensure a uniform pedaling action or simulate the functioning of a bicycle.

4. Brake assembly as claimed in claim 1, wherein said permanent magnets (18) are at least partly encased in recesses (23) formed on said rotor (17).

5. Brake assembly as claimed in claim 1, comprising ventilation means (24) located between said rotor (17) and said stator (19).

6. Brake assembly as claimed in claim 5, wherein said ventilation means (24) comprise of a rotating fan (25) fixed to said rotor (17) or keyed onto said shaft (10).

7. Brake assembly as claimed in claim 1, wherein said ferromagnetic disk (20) is provided with through-holes (26) able to allow the passage of cooling air.

8. Brake assembly as claimed in claim 1, wherein said shaft (10) is supported on said support structure (7) by means of bearings (9).

9. Brake assembly as claimed in claim 1, wherein said shaped plate (21) is made of aluminum or copper or a paramagnetic material.

10. Brake assembly as claimed in claim 1, wherein said shaped plate (21) is fixed to said ferromagnetic disk (20) by fixation means (22) including screws, rivets or glue.

11. Brake assembly as claimed in claim 1, comprising adjustment means (27) associated with said magnetic means (13) for varying the intensity of said resistive torque.

12. Brake assembly as claimed in claim 11, characterized in that said adjustment means (27) comprise:
   a guide (28) integral with said support structure (7);
   a slider (29) rigidly connected to said stator (19) and able to slide along said guide (28);
   actuator means (31) acting on said slider (29) to drive it along said guide (28), to thereby move said stator (19) selectively into different operating positions, towards or away from said rotor (17).

13. Brake assembly as claimed in claim 12, comprising a compression spring (33) located between said support structure (7) and said slider (29).

14. Brake assembly as claimed in claim 12, wherein said actuator means (31) comprise a lever (35) to which at least one engaging element (36) is associated that is susceptible to engage in different seats (32) formed on said slider (29) and corresponding to said different operating positions of said stator (19) with respect to said rotor (17).

15. Brake assembly as claimed in claims 13 and 14 wherein said compression spring (33) is resiliently biasing said slider (29) into bearing contact against the engaging element (36) associated with said lever (35).

16. Brake assembly as claimed in claim 14, wherein said lever (35) extends from an annular element (34) having said at least one engaging element (36) attached thereto.

17. Brake assembly as claimed in claim 14, wherein said seats (32) are arranged in a succession corresponding to a gradual and linear variation in the resistive torque.

18. Brake assembly as claimed in claim 1, comprising a roller (6) keyed onto said first portion (11) of said rotating shaft (10) and capable of abutting against a wheel of a bicycle.

* * * * *